July 24, 1951 R. L. McMULLEN 2,561,937
ANCHOR PAD FOR MUSICAL INSTRUMENTS
Filed Sept. 21, 1949
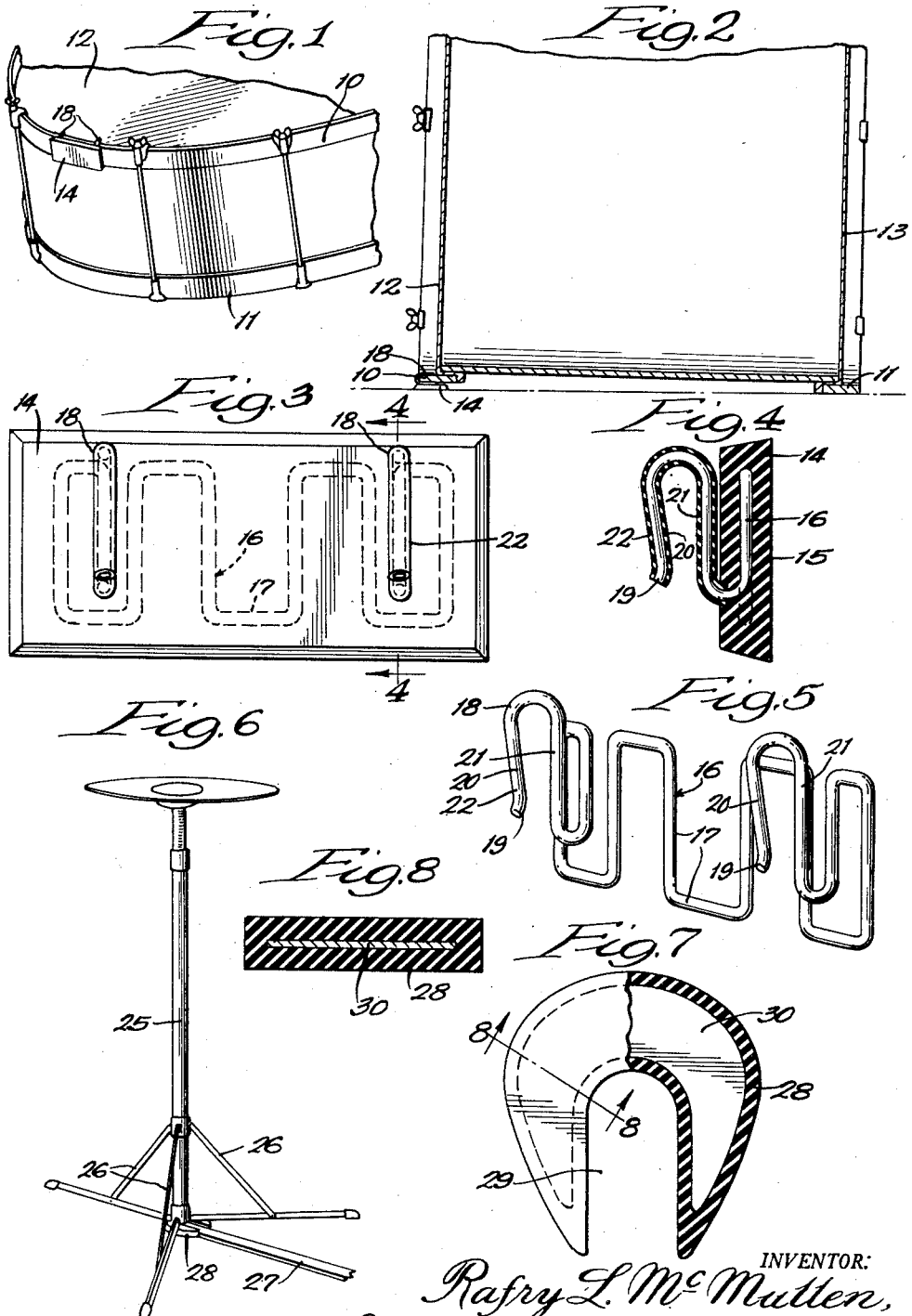
INVENTOR:
Rafry L. McMullen,
BY Dawson, Ooms, Booth and Spangenberg,
ATTORNEYS.

Patented July 24, 1951

2,561,937

UNITED STATES PATENT OFFICE 2,561,937

ANCHOR PAD FOR MUSICAL INSTRUMENTS

Rafry L. McMullen, Spokane, Wash.

Application September 21, 1949, Serial No. 116,932

6 Claims. (Cl. 84—421)

This invention relates to an anchor pad, and particularly to anchor pads for musical instruments which are adapted to rest upon a supporting surface, the pad being used to prevent inadvertent and undesirable movement of the instrument while it is being played and to minimize transmission of vibrational forces to or from the instrument.

It is an object of this invention to produce a new and improved anchor pad of the type described. It is a related object to produce an anchor pad which is sturdy in construction, economical to manufacture, easy to adjust into position of use and which retains its properties for a substantial period of time to give long life.

These and other objects and advantages of this invention will hereinafter appear, and for purposes of illustration, but not of limitation, embodiments of this invention are shown in the accompanying drawing, in which—

Figure 1 is a perspective view of a bass drum provided with an anchor pad embodying features of this invention; Fig. 2 is a sectional elevational view of a part of the assembly shown in Fig. 1; Fig. 3 is an enlarged top view of an anchor pad embodying features of this invention; Fig. 4 is a sectional view taken along the line 4—4 of Fig. 3; Fig. 5 is a perspective view of the wire frame member used in the anchor pad shown in Fig. 3; Fig. 6 is a perspective view of another musical instrument provided with a modified form of an anchor pad embodying features of this invention; Fig. 7 is a fragmentary top view of the pad shown in Fig. 6; and Fig. 8 is a sectional view taken along the line 8—8 of Fig. 7.

An anchor pad embodying features of this invention is constructed of a block of soft pliable material having a high coefficient of friction with the surface upon which it rests while in position of use. A frame member is embedded within the block in parallel relation with the surface upon which the pad rests while in position of use to reinforce the block and to give it shape and sustenance. Means forming a part of the block and preferably integral with the frame are provided to secure the pad in position of use on the instrument.

Figs. 1-5 inclusive illustrate an anchor pad adapted for use in combination with a bass drum. A drum of the type described is usually constructed with front and rear rims 10 and 11 which extend outwardly from the peripheral edges of spaced drum heads 12 and 13.

As shown, the anchor pad comprises a block of soft pliable material having a high coefficient of friction with the surface upon which it rests. The block 14 is formed rectangular or to other geometric shape with the upper and lower faces 15a and 15 substantially in parallelism with the surface upon which it is adapted to rest when in position of use. It is preferably formed relatively flat to give maximum contact with the surface and to a thickness over one-quarter inch, but usually less than one inch. Embedded within the block 14 is a reinforcing member 16 which may be a relatively rigid plate formed of material such as wood, metal, alloys, or the like, but it is preferably formed of spring wire, the intermediate portion of which is looped back and forth, as indicated by the numeral 17, in a plane which is in parallel relation with the face 15 on the under side of the block. The free end portions of the wire extend from the upper wall of the block in perpendicular relation with the plane in which the frame lies, the end portions being looped back and forth to form spring clips 18 and 19 which are adapted to snap over the free end portion of the rim 10 to secure the pad in position of use on the bass drum. The ends of the wires are turned outwardly to facilitate slipping the spring clips onto the rim of the drum which is held in gripping relation between divergently spaced arms 20 and 21 forming the spring clip.

To position the anchor pad upon the rim of the drum it is only necessary to snap the clips upon the rim. Removal of the anchor pad is as easily effected by sliding the clips from the rim. To minimize wear on the drum parts and to prevent slippage of the anchor pad while in position of use, it is expedient to cover the outwardly extending portions of the wire formed into spring clips with a rubber-like jacket such as the rubber tubing indicated by the numeral 22. Best use is made of a length of rubber tubing which is slightly greater than the length of the outwardly extending portion of the wire frame whereby a small amount of the tubing becomes embedded in the upper wall of the block 14.

The modification shown in Figs. 6, 7, and 8 is adapted to be used with a musical instrument, such as a cymbal, which is supported upon an upright shaft 25 which rests upon a supporting surface and is held upright by a tripod 26. The relative position of the cymbal with respect to the other instruments adapted to be played by the same operator is sought to be prevented by securing the upright 25 to the other instruments by straps 27. However, it has been found that while playing the instrument there is still some tendency for the stand to shift away from the operator in side-wise directions.

To minimize such inadvertent lateral shifting movement, I provide a modified form of anchor pad consisting of a block 28 of anti-friction material which is provided with a slotted portion 29 dimensioned to slip about the shaft 25 when in position of use.

Embedded within the block 28 is a relatively rigid reinforcing frame 30 in the form of a relatively thin plate of metal plastic laminate or other rigid material contoured to correspond with the block and lying in a plane parallel with the face of the block which rests upon the supporting surface. The reinforcing member is of lesser dimension all around than the block in order that it might be completely embedded therein, and in position of use it lends shape and sustenance to the block.

To position this modified form of anchor pad to minimize inadvertent movement of the upright shaft 25, the block is slipped about the base of the shaft in contacting relation with the supporting surface with the slotted opening 29 extending in the direction of the securing straps 27. In this position the anti-slip material is disposed all around the sides of the upright to co-operate with the straps in preventing inadvertent movement of the stand in any direction.

Suitable material of which the blocks 14 or 28 may be formed is selected of substances having a high coefficient of friction with the surface upon which it is adapted to rest. A material having exceptional properties in this respect is a highly plasticized modified polyvinyl chloride manufactured by the Calresin Corporation of Culver City, California. Though not equivalent, other rubber or rubber-like materials of the softer variety may be used.

Best use is made of a thermoplastic resinous material which is highly plasticized to give the desired soft and pliable characteristics. This type of material develops a high coefficient of friction with practically every type of supporting surface, and in the event that the resistance to slippage becomes less during use as the result of concentration of plasticizer or lubricant on the surface, the desired coefficient of friction may be restored by cleaning the contacting surface with suitable solvents such as benzene, toluene, and the like.

It will be understood that other securing means may be adapted to position the reinforced block upon any desired type of musical instrument, which means may be fixed to the block or made integral with the frame embedded within the block. It will be further understood that numerous changes may be made in the details of construction, arrangement, and operation without departing from the spirit of the invention, especially as defined in the following claims.

I claim:

1. An anchor pad comprising a block of soft pliable material having a high coefficient of friction with the surface upon which it rests while in position of use, a reinforcing frame embedded within the block intermediate the top and bottom walls in parallel relation with the surface upon which the pad rests while in position of use, and means forming a part of the pad for securing same in position of use.

2. An anchor pad for musical instruments comprising a block of soft pliable anti-slip material having the contacting face substantially in parallelism with the surface upon which it rests while in position of use, a reinforcing and stiffening frame extending through the central portion of the pad in parallel relation with the contacting face, and spring clips integral with the frame for securing the pad in position of use on the musical instrument.

3. An anchor pad for a bass drum comprising a block of soft pliable anti-slip material having a contacting face substantially in parallelism with the surface upon which is rests while the pad is in position of use, a spring wire looped back and forth intermediate its ends in a single plane to form a frame which is concealed within the block in parallel relation with the contacting face, the ends of the wire which extend from the block in perpendicular relation with the plane being looped into a spring clip for securing the pad onto the rim of the bass drum.

4. An anchor pad for a musical stand having an upright shaft which rests upon the supporting surface comprising a block of soft pliable anti-slip material having a contacting face in parallelism with the supporting surface when the pad is in position of use with a slot therein dimensioned to permit the block to be slipped about the upright shaft in position of use, and a reinforcing and stiffening frame embedded within a central portion of the block in parallel relation with the contacting face.

5. An anchor pad as claimed in claim 3 in which the anti-slip material of which the block is formed comprises a highly plasticized thermoplastic resinous material having a high coefficient of friction to the surface upon which it rests while in position of use.

6. An anchor pad as claimed in claim 3 in which the anti-slip material of which the block is formed is a plasticized modified polyvinyl chloride.

RAFRY L. McMULLEN.

REFERENCES CITED

The following references are of record in the file of this patent:

UNITED STATES PATENTS

| Number | Name | Date |
|---|---|---|
| 1,750,803 | Hayden | Mar. 18, 1930 |
| 1,786,478 | Connell | Dec. 30, 1930 |
| 1,920,850 | Ebert | Aug. 1, 1933 |